(12) United States Patent
Ferris et al.

(10) Patent No.: US 9,563,479 B2
(45) Date of Patent: *Feb. 7, 2017

(54) BROKERING OPTIMIZED RESOURCE SUPPLY COSTS IN HOST CLOUD-BASED NETWORK USING PREDICTIVE WORKLOADS

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 444 days.

This patent is subject to a terminal disclaimer.

(21) Appl. No.: 12/957,274

(22) Filed: Nov. 30, 2010

(65) Prior Publication Data

US 2012/0137002 A1 May 31, 2012

(51) Int. Cl.
G06F 15/173 (2006.01)
G06F 9/50 (2006.01)

(52) U.S. Cl.
CPC ....... *G06F 9/5072* (2013.01); *G06F 2209/508* (2013.01); *G06F 2209/5019* (2013.01)

(58) Field of Classification Search
USPC .......................... 718/102–104; 709/224, 226
See application file for complete search history.

(56) References Cited

U.S. PATENT DOCUMENTS

| | | | |
|---|---|---|---|
| 6,021,402 A | 2/2000 | Takriti | |
| 6,463,457 B1 | 10/2002 | Armentrout et al. | |
| 6,988,087 B2 | 1/2006 | Kanai et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 8,104,041 B2 * | 1/2012 | Belady et al. | 718/105 |

(Continued)

OTHER PUBLICATIONS

"rBuilder and the rPath Appliance Platform", 2007 rPath, Inc., www.rpath.com, 3 pgs.

(Continued)

*Primary Examiner* — Khaled Kassim
*Assistant Examiner* — Zhaohui Yang
(74) *Attorney, Agent, or Firm* — Lowenstein Sandler LLP

(57) ABSTRACT

Embodiments relate to brokering optimized resource supply costs in a host cloud-based network using predictive workloads. In aspects, a set of usage histories can store patterns for users in a host cloud-based network recording the consumption of processor, memory, storage, operating system, application, or other resources subscribed to by the user. The operator of the cloud management system hosting the workloads of one or more users can track the aggregate user histories reflecting those workloads, and analyze them in terms of different time periods over which demands for resources may intensity or relax. The cloud management system can examine those workload patterns, and generate a set of predictively re-assigned workloads to be supported by different sets of resource servers during offpeak and/or other periods. The workload realignment to different resource servers can permit the operator of the cloud management system and/or other cloud provider to realize cost savings or other benefits by procuring resources on a predictive basis.

23 Claims, 7 Drawing Sheets

(56) References Cited

U.S. PATENT DOCUMENTS

| | | |
|---|---|---|
| 8,214,461 B1 | 7/2012 | Graupner et al. |
| 8,413,155 B2 | 4/2013 | Jackson |
| 8,464,255 B2* | 6/2013 | Nathuji ................ G06F 9/5077 |
| | | 718/1 |
| 8,560,677 B2 | 10/2013 | VanGilder et al. |
| 2001/0039497 A1 | 11/2001 | Hubbard |
| 2002/0069276 A1 | 6/2002 | Hino et al. |
| 2002/0120744 A1 | 8/2002 | Chellis et al. |
| 2002/0165819 A1 | 11/2002 | McKnight et al. |
| 2003/0037258 A1 | 2/2003 | Koren |
| 2003/0105810 A1* | 6/2003 | McCrory et al. ............. 709/203 |
| 2003/0110252 A1 | 6/2003 | Yang-Huffman |
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0283784 A1 | 12/2005 | Suzuki |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0070771 A1* | 3/2009 | Yuyitung et al. ............ 718/105 |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0004965 A1 | 1/2010 | Eisen |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0211669 A1 | 8/2010 | Dalgas et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0099403 A1* | 4/2011 | Miyata et al. ................. 713/323 |
| 2011/0131335 A1* | 6/2011 | Spaltro et al. ................ 709/228 |
| 2011/0138384 A1* | 6/2011 | Bozek ................. H04L 41/0806 |
| | | 718/1 |
| 2011/0145392 A1* | 6/2011 | Dawson et al. ............. 709/224 |
| 2011/0167469 A1* | 7/2011 | Letca et al. ....................... 726/1 |
| 2011/0213508 A1* | 9/2011 | Mandagere et al. ........... 700/291 |
| 2011/0239010 A1* | 9/2011 | Jain ....................... G06F 1/3209 |
| | | 713/310 |
| 2011/0289329 A1 | 11/2011 | Bose et al. |
| 2011/0302078 A1 | 12/2011 | Failing |
| 2012/0023223 A1 | 1/2012 | Branch et al. |
| 2012/0054345 A1* | 3/2012 | Sahu et al. .................... 709/226 |
| 2012/0254640 A1 | 10/2012 | Agarwala et al. |
| 2012/0296852 A1 | 11/2012 | Gmach et al. |
| 2012/0310765 A1 | 12/2012 | Masters |
| 2013/0159596 A1 | 6/2013 | Van De Ven et al. |

OTHER PUBLICATIONS

White Paper—"Best Practices for Building Virtual Appliances", 2008 rPath, Inc., www.rpath.com, 6 pgs.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments" U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al, "Methods and Systems for Verifying Software License Compliance in Cloud Computing Environments", U.S. Appl. No. 12/627,643, filed Nov. 30, 2009.

Ferris et al, "Systems and Methods for Service Aggregation Using Graduated Service Levels in a Cloud Network", U.S. Appl. No. 12/628,112, filed Nov. 30, 2009.

Ferris et al, "Methods and Systems for Generating a Software License Knowledge Base for Verifying Software License Compliance in Cloud Computing Environments", U.S. Appl. No. 12/628,156, filed Nov. 30, 2009.

(56) References Cited

OTHER PUBLICATIONS

Ferris et al, "Methods and Systems for Converting Standard Software Licenses for Use in Cloud Computing Environments", U.S. Appl. No. 12/714,099, filed Feb. 26, 2010.
Ferris et al, "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Synthesis and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Ferris et al., "Systems and Methods for Combinatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud" U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris at al., "Systems and Methods for Identifying Service Dependencies in a Cloud Deployment", U.S. Appl. No. 12/952,857, filed Nov. 23, 2010.
Ferris et al., "System and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of lauds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/964,352, filed Nov. 24, 2010.
Ferris et al. "Systems and Methods for Migrating Software Modules into One or More Clouds", U.S. Appl. No. 12/952,701, filed Nov. 23, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 27, 2011.
Healey, Matt, White Paper—"Virtualizing Support", Mar. 2008, IDC, 9 pages.
USPTO, Non-Final Office Action, U.S. Appl. No. 12/954,378 mail date Dec. 11, 2013, 39 pages.
USPTO, Final Office Action, U.S. Appl. No. 12/954,378, mail date Mar. 20, 2014, 21 pages.
USPTO, Advisory Action, U.S. Appl. No. 12/954,378, mail date May 2, 2014, 3 pages.
USPTO, Non-Final Office Action, U.S. Appl. No. 12/954,378, mail date Jul. 15, 2014, 26 pages.
USPTO, Final Office Action, U.S. Appl. No. 12/954,378, mail date Dec. 31, 2014, 25 pages.
USPTO, Advisory Action, U.S. Appl. No. 12/954,378, mail date Mar. 12, 2015, 6 pages.
USPTO, Non-Final Office Action, U.S. Appl. No. 12/954,378, mail date May 29, 2015, 26 pages.
USPTO, Final Office Action, U.S. Appl. No. 12/954,378, mail date Sep. 22, 2015, 30 pages.

(56) References Cited

OTHER PUBLICATIONS

USPTO, Advisory Action, U.S. Appl. No. 12/954,378, mail date Nov. 27, 2015, 3 pages.

* cited by examiner

BROKERING OPTIMIZED RESOURCE SUPPLY COSTS IN HOST CLOUD-BASED NETWORK USING PREDICTIVE WORKLOADS

FIELD

The invention relates generally to systems and methods for brokering optimized resource supply costs in a host cloud-based network using predictive workloads, and more particularly, to platforms and techniques for generating sets of predictively re-assigned workloads that can leverage better operating costs or other factors for cloud operators whose users demonstrate reduced resource demand and/or other consumption behavior at offpeak or other times.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent clouds to support the user's cloud deployment. That user may further instantiate and use multiple applications or other software or services inside or across multiple of those cloud boundaries, and those resources may be used or consumed by multiple or differing end-user groups in those different cloud networks.

In terms of the procurement of processor, memory, storage, and/or other resources required to support one or more sets of users, the cloud management system of a set of host clouds may locate and install or provide those resources on a subscription, marketplace, and/or other basis. For users whose resource demands demonstrates a timer-dependent pattern, such as a relaxation of resource consumption during overnight, offpeak, and other hours or periods, it could be advantageous to time or predict the need to procure resources based on known consumption behavior. In aspects, a cloud operator could scale down or otherwise adjust the resources procured from a set of cloud resource servers if service level needs are known or could be predicted in advance, permitting potentially lower cost, reduced storage needs, decreased failover or rollover capacity, and/or otherwise altered configurations of the resources needed to support users in the operator's set of host clouds. It may be desirable to provide systems and methods for brokering optimized resource supply costs in a host cloud-based network using predictive workloads, in which workloads of users can be predictively re-assigned or shifted to leverage advantageous cloud support conditions in varying resource servers, based on estimated support requirements or levels in predetermined time periods.

DESCRIPTION

Figure 1:
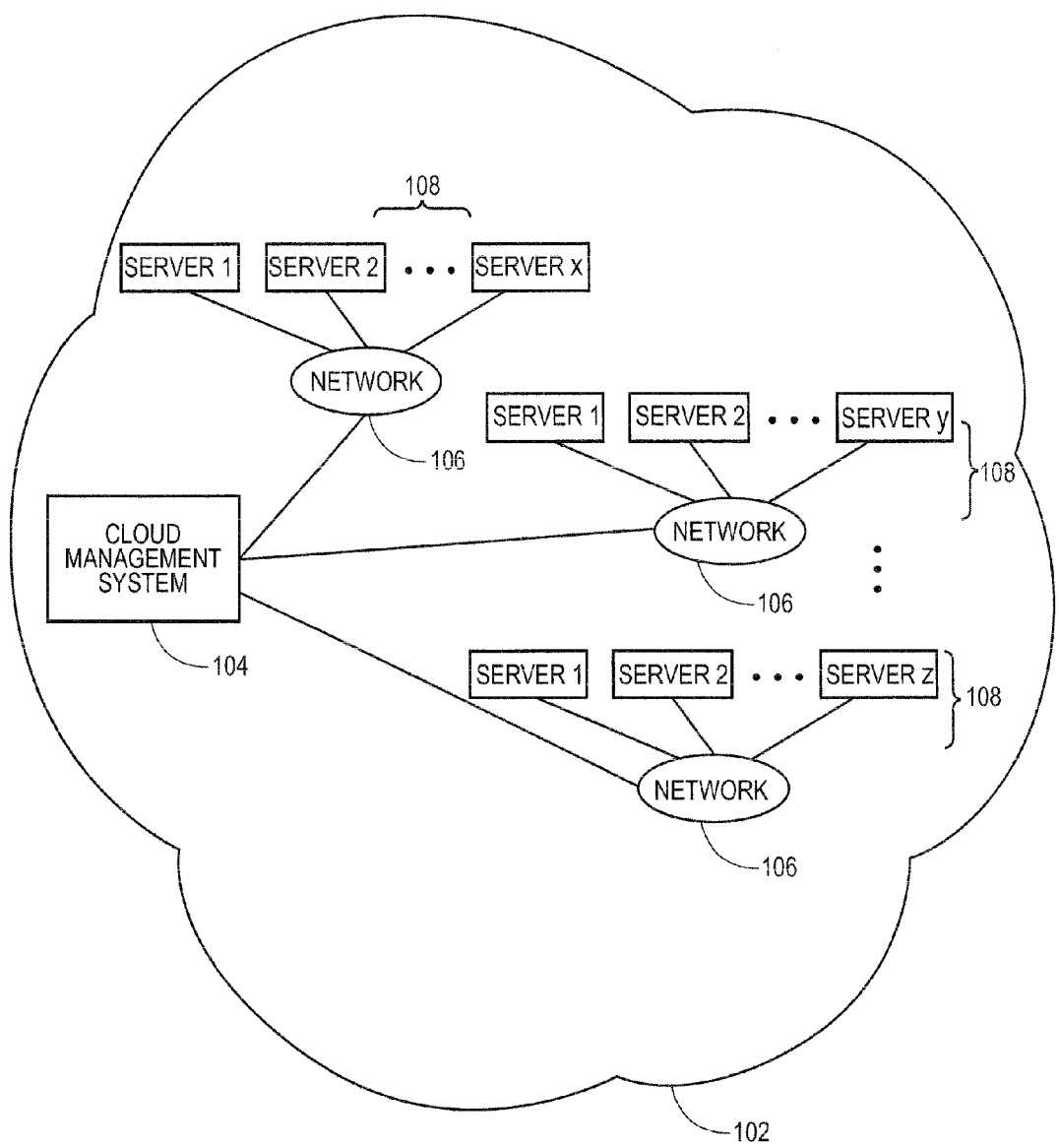
FIG. 1 illustrates an overall cloud system architecture in which various aspects of systems and methods for brokering optimized resource supply costs in a host cloud-based network using predictive workloads can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
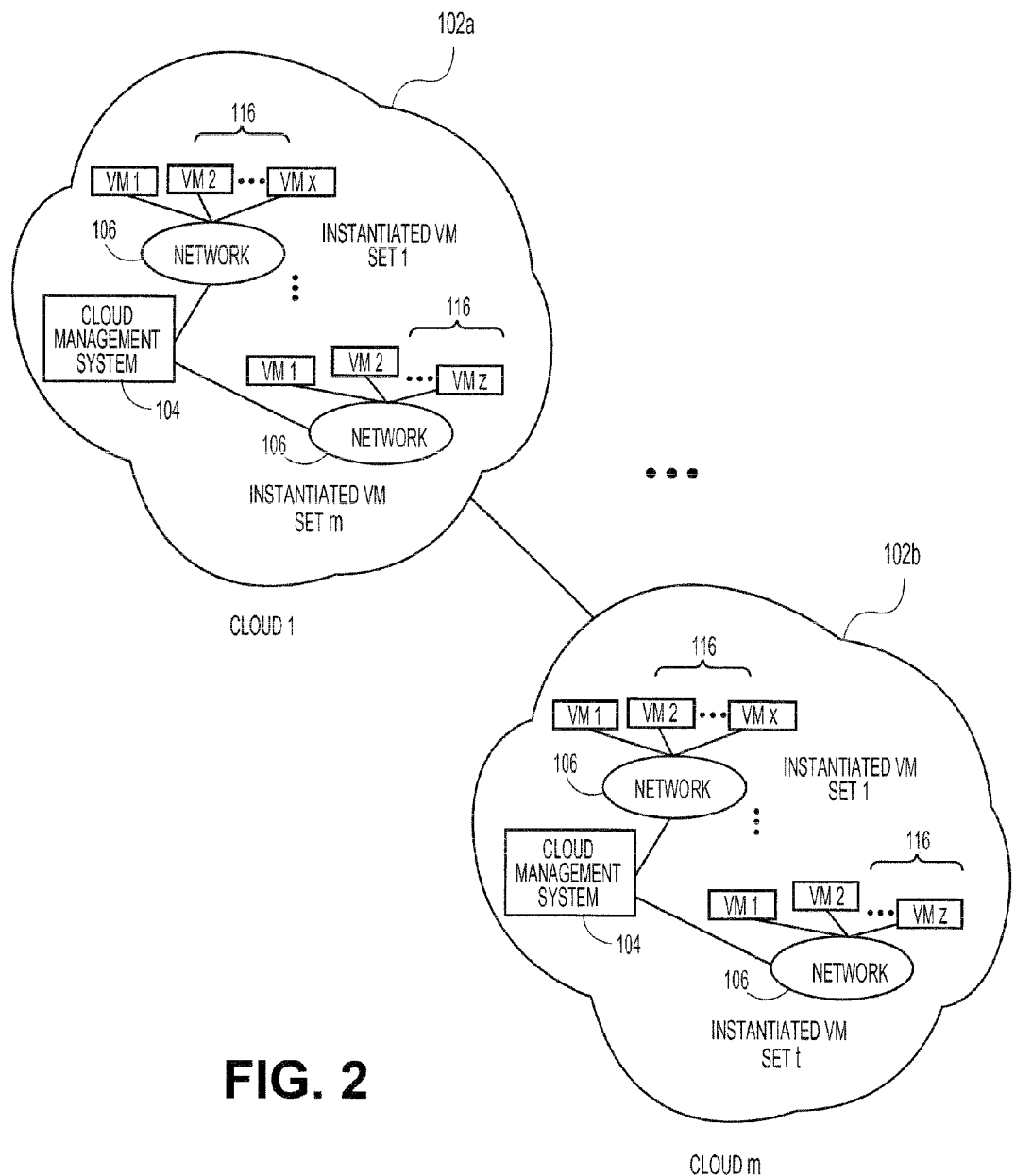
FIG. 2 illustrates an overall cloud system architecture in which various aspects of systems and methods for brokering optimized resource supply costs in a host cloud-based network using predictive workloads can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a JAVA™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Figure 3:
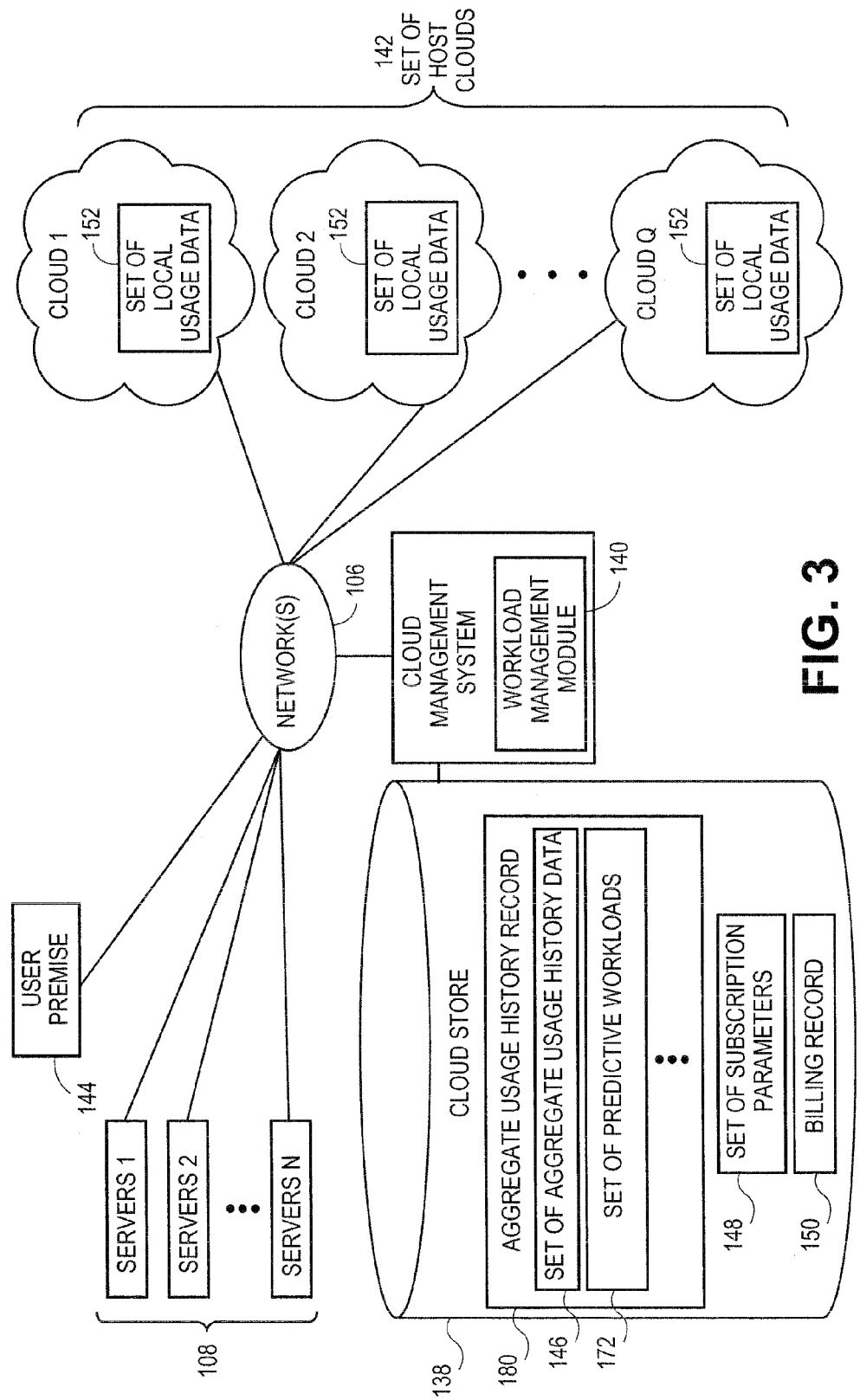
FIG. 3 illustrates a network configuration in which predictively re-assigned workloads can be identified and serviced from different sets of resource servers, according to various embodiments.

In aspects, the cloud management system 104 and/or other logic or service that manages, configures, and tracks cloud activity can be configured to track and identify aggregate usage patterns of one or more users, and relate those patterns to the available set or sets of resource servers 108 to generate a predictive re-balancing or re-distribution of the servers and resources that will be required to support differing workloads over different time periods. In those regards, FIG. 3 shows an illustrative network configuration in which systems and methods for brokering optimized resource supply costs in host cloud-based network using predictive workloads can be implemented, according to various embodiments. In embodiments as shown, one or more users can operate a user premise 144, such as a local area network with a set of client machines, and/or other machines or resources. In aspects, the user can in addition or instead operate one or more sets of virtual machines, appliances, and/or other virtual entities (not shown) in a set of host clouds 142. In aspects, the set of host clouds 142 can include a set of diverse and/or otherwise unrelated cloud-based networks to which the user or users can subscribe for various resources under various subscription terms, criteria, service level agreements, and/or other conditions, which can be recorded or reflected in a set of subscription parameters 148. The set of subscription parameters 148 can for instance be stored in the cloud store 138 hosted or accessed by a cloud management system 104, and/or in other storage resources or locations.

In aspects, the consumption of resources in the set of host clouds 142, the assignment of user workloads to specific support servers in the set of support servers 108, generation of related billing events, and other workload and subscription-related activities can be tracked and managed by an workload management module 140, which can be hosted in the cloud management system 104 and/or in other locations, resources, or services. According to aspects, the workload management module 140 can communicate with the set of resource servers 108 including hardware support servers, and/or other resource providers, such as the vendors of software such as operating systems, applications, utilities, and/or other programs, services, and/or related resources. The cloud management system 104 can maintain part or all of the terms, conditions, limits, criteria, stipulations, and/or other parameters of the user's subscription to one or more resources hosted or provisioned in the set of host clouds 142, and for instance reflected in the set of subscription parameters 148. In embodiments, the relationship between the user premise 144 when present and the set of host clouds 142 can be configured to operate on a rollover or failover basis, for instance, to provide instances of virtual machines for the user when the installed hardware and associated resources of the user premise 144 is insufficient to support immediate processing, throughput, and/or other demands. In aspects, the user can operate virtual machines, virtual appliances, and/or other entities in the set of host clouds 142, and each host cloud in the set of host clouds 142 can capture and store a set of local usage data 152 reflecting those operations. The set of local usage data 152 can record the consumption or use of resources in a local host cloud in the set of host clouds 142, such as the number of instances of software including operating systems and applications, processor resources, memory resources, communications resources, storage resources, and/or other elements or resources. The cloud management system 104, workload management module 140, and/or other logic or service can periodically receive the set of local usage data 152 and/or updates to that information from one or more host clouds in the set of host clouds 142. The receipt of the set of local usage data 152 or any portion of the set of local usage data 152 can be performed in aspects on a pull or demand basis, where the workload management module 140 and/or other logic can issue commands or instructions to one or more host clouds in the set of host clouds 142, and receive that data back from the interrogated cloud or clouds. In aspects, the set of local usage data 152 can be transmitted to the workload management module 140 on a push basis, for instance, on a predetermined, event-triggered, and/or other basis initiated by one or more of the host clouds in set of host clouds 142, themselves. Other channels, schedules, and techniques for the collection of the set of local usage data 152 from any one or more of the set of host clouds 142 can be used.

After receipt of the set of local usage data 152, any portion or component of the set of local usage data 152, and/or updates to the same, the workload management module 140 can collect and aggregate the set of local usage data 152 from the various host clouds and organize that data in a set of aggregate usage history data 146. The set of aggregate usage history data 146 can reflect recent and/or accumulated usage consumption by the subject user(s) in all of the set of host clouds 142, over comparatively short-term periods or intervals such as minutes, one or more hours, one day, a number of days, a week, and/or over other periods. In aspects, the workload management module 140 can collect the set of local usage data 152 regardless of whether each of those clouds is configured to communicate with each other or not. In aspects, the set of aggregate usage history data 146 can present to the workload management module 140 and/or other logic the combined resource consumption by the user across the user premise 144 and/or all operating virtual machines or entities in the set of host clouds 142, on an hour-by-hour and/or other relatively short-term basis. In aspects, cloud management system 104, the workload management module 140 and/or other logic or service can operate on the set of aggregate usage history data 146 to generate a set of predictively re-assigned workloads 162 that can be advantageously shifted or re-distributed to different support servers in the set of support servers 108 over different time periods, to offer the cloud operator or other entity greater flexibility in procurement costs, service levels, and/or other factors or conditions.

Figure 4A:
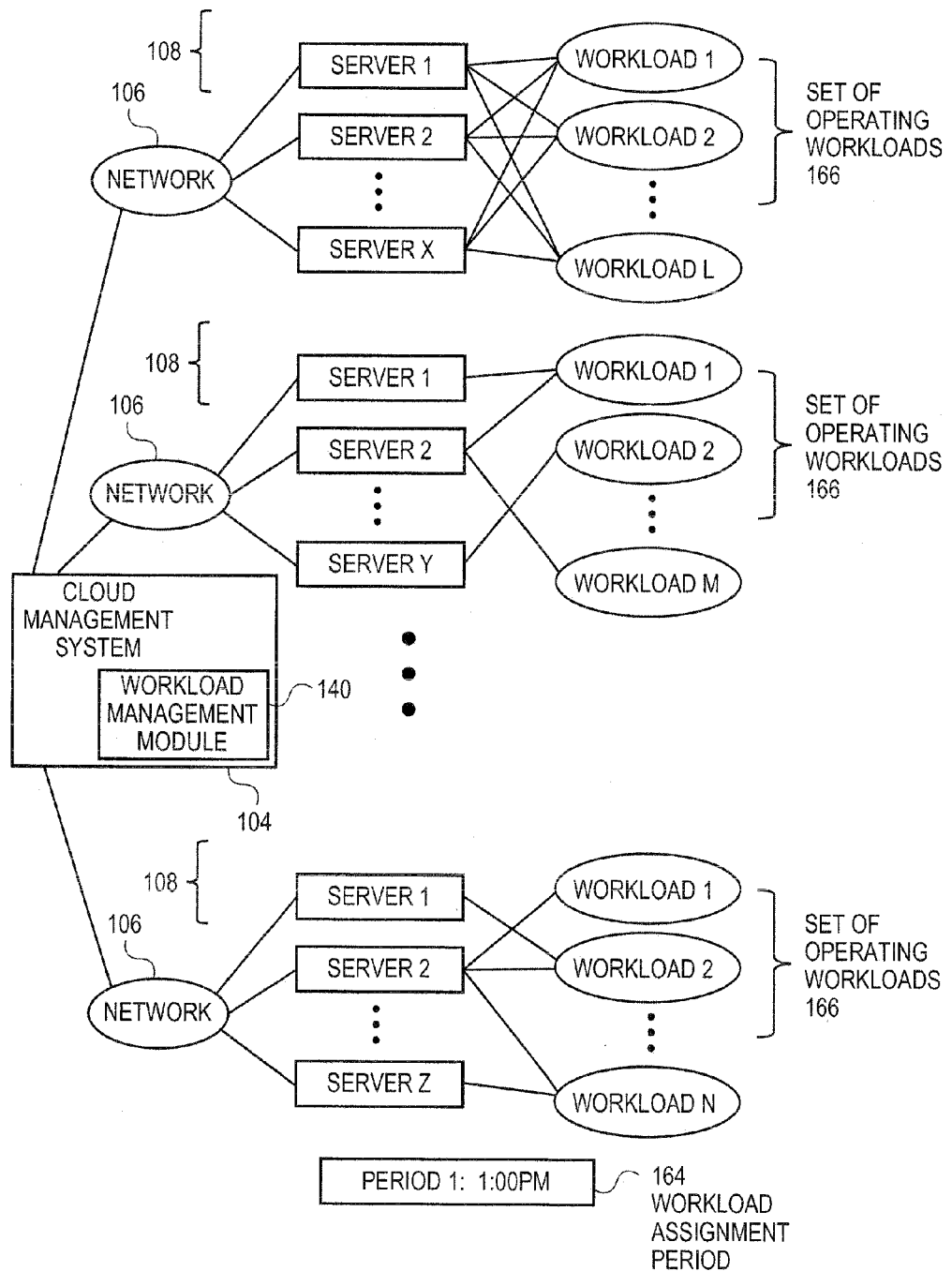
FIGS. 4A and 4B illustrate the generation of sets of predictively re-assigned workloads at or during different workload assignment periods, according to aspects.

More particularly, and as for instance shown in FIG. 4A, in aspects a user or set of users can generate and execute a set of operating workloads 166 that are constructed, configured, and/or otherwise instantiated from resources provided or delivered by the set of resource servers 108. As described herein, the resources provided by the set of resource servers 108 can be or include any hardware, software, and/or service required to execute the set of operating workloads 166. The set of operating workloads 166 can, in aspects, include the total set of executing operating systems, applications, input/output (I/O) operations, storage operations, computational tasks, and/or other workloads or compute or communication activity carried out by the virtual machines, virtual appliances, and/or other entities of one or more users hosted in the set of host clouds 142, and/or in other locations. In a given workload assignment period 164 (merely illustratively, at 1:00 p.m.) the supporting servers in set of resource servers 108 and/or other grid or infrastructure being used or operated to support the one or more users in set of host clouds 142, can have a given distribution or arrangement. The distribution or arrangement of those support resource's at a given time can be determined or partly determined by factors including the set of subscription parameters 148 governing resource usage and cloud operations for a given user or users, along with other factors. In aspects, illustrative sets of resource procurement parameters by which a cloud operator or other entity can identify and acquire resources to support the set of host clouds 142 can include, merely illustratively, any one or more of a subscription cost, a minimum number of software images to be deployed in the set of host clouds 142, a maximum number of software images to be deployed in the set of set of host clouds 142, an operating system specification, a software application specification, a minimum processor throughput specification, a maximum processor throughput specification, a minimum memory amount specification, a maximum memory amount specification, a minimum storage capacity specification, a maximum storage capacity specification, a minimum bandwidth specification, a maximum bandwidth specification, a minimum set of communications ports specification, a maximum set of communications ports specification, an appliance specification, a service level agreement specification, and/or any services in support of any of the foregoing, as well as other services provided to or via the set of host clouds 142. Such services can include, also merely illustratively, services such clustering services, identity management services, backup services, billing and administrative services, security services, and/or other services in support of the set of host clouds 142 and/or associated users or entities.

Figure 4B:
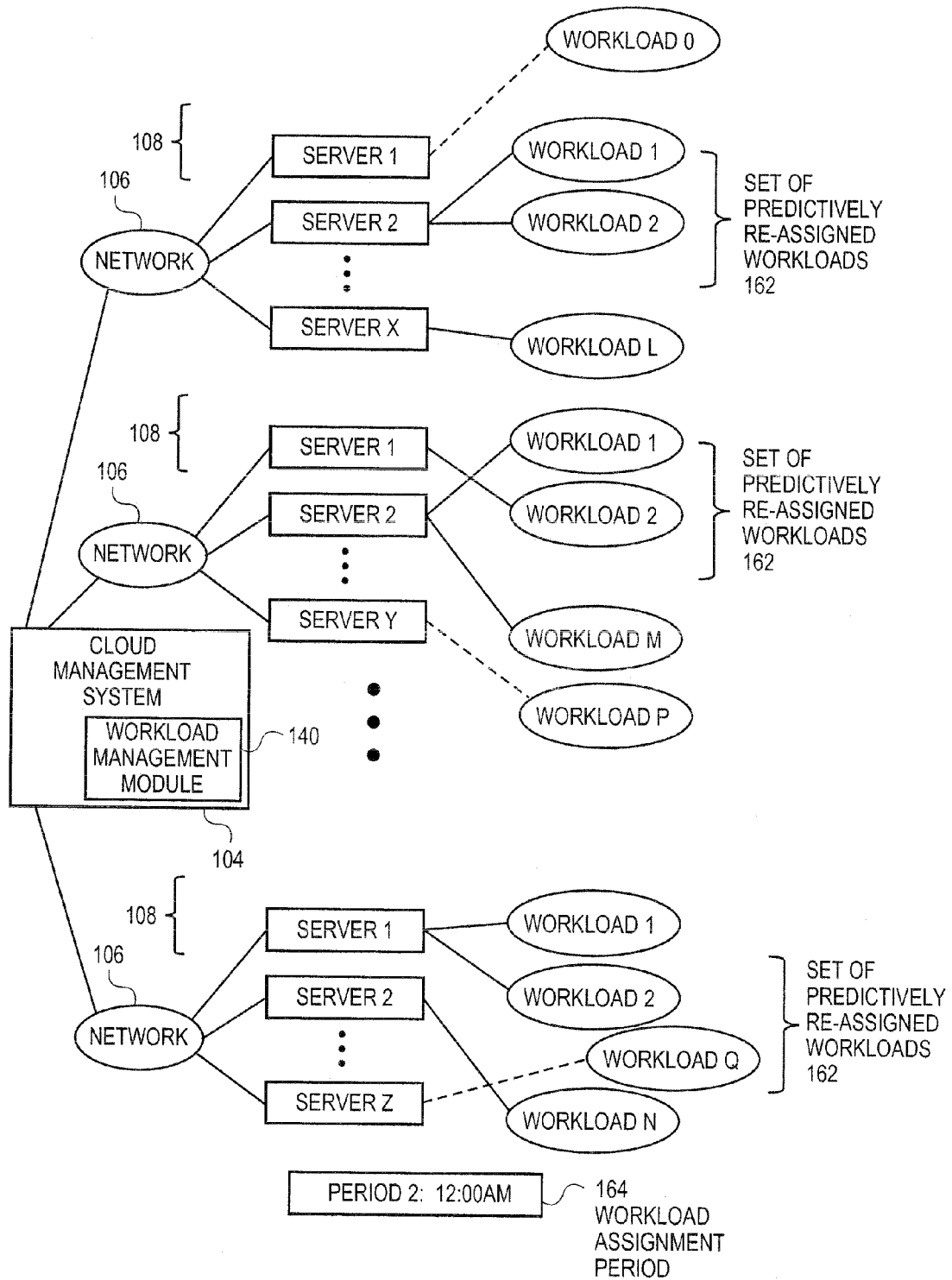

In aspects according to the present teachings, the cloud management system 104, workload management module 140, and/or other logic or service can examine the set of operating workloads 166 and generate a predictive mapping or transition of those workloads to a different set or subset of the set of support servers 108, for one or more workload assignment period 104 in the future. As shown for instance in FIG. 4B, the cloud management system 104, workload management module 140 and/or other logic can generate a resulting set of predictively re-assigned workloads 162 whose supporting processor, memory, storage, operating system, application, and/or other hardware, software, or service requirements are met by different support servers in set of resource servers 108, and/or other resource providers at one or more workload assignment period 164 the procurement cost and/or conditions of which may be preferable or desirable to the operator of the cloud management system 104 and/or other entity. Thus, at a workload assignment period of 12:00 midnight to 6:00 a.m. during weekdays or at other times, a user such as a banking or retail entity may demonstrate low or bursty demand for processor, memory, storage, operating system, application, and/or other resources, during which period the operator of the cloud management system 104 and/or other cloud provider may by default be obligated to procure or obtain those resources from a default set of resource servers 108. In cases, the cost to the operator of the cloud management system 104 and/or other provider or entity may be greater than necessary, if for instance that entity continues to pay or accrue resource acquisition costs, even when the fully subscribed or maintained level of hardware, software, service, and/or other resources are not being consumed, in such cases and others, the cloud management system 104, workload management module 140, and/or other logic or service can predict or project a reduced workload for that banking or retail entity for the hours of 12:00 midnight to 6:00 a.m., and analyze sets of alternative resource servers, providers, and/or other resource sources which could deliver the same or an adjusted level of the same resources under more advantageous costs and/or conditions. In aspects, with the benefit of reducing and/or otherwise adjusting claims on the resources available from the set of resource servers 108, the operator of the cloud management system 104 could in addition or alternatively proceed to insert additional workloads (illustrated as Workloads "O," "P," "Q") into the set of predictively re-assigned workloads 162, to more fully extract or consume resources which that operator or entity has already procured or will procure. Other decision logic, rules, filters, criteria, and/or factors can be used to migrate, re-distribute, change, update, reconfigure, and/or otherwise manage or alter the set of workloads from the set of operating workloads 166 and/or other workload source on a time-varying and/or predictive basis, to enhance resource acquisition costs and/or other conditions.

Figure 5:
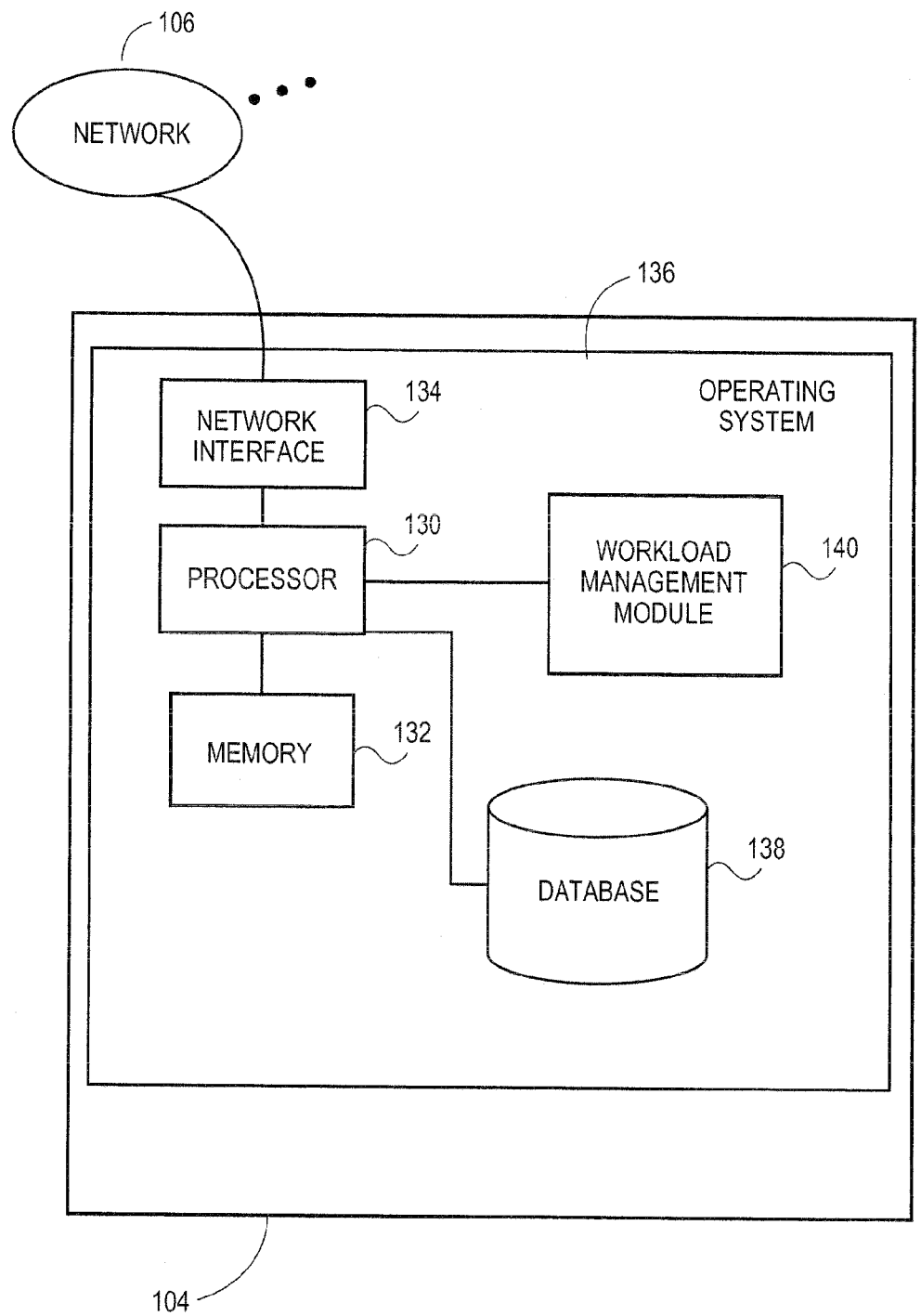
FIG. 5 illustrates an exemplary hardware configuration for a cloud management system that can support and maintain one or more cloud-based networks, according to various embodiments.

FIG. 5 illustrates an exemplary diagram of hardware and other resources that can be incorporated in a cloud management system 104 configured to communicate with the set of instantiated virtual machines 116, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, the set of target clouds 152, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with workload management module 140, and/or other interfaces, applications, services, and/or logic. Other configurations of the cloud management system 104, associated network connections, and other hardware, software, and service resources are possible. It may be noted that in embodiments, the set of resource servers 108, and/or other hardware machines, platforms, or engines can comprise the same or similar resources as cloud management system 104, or can be configured with different hardware and software resources.

Figure 6:
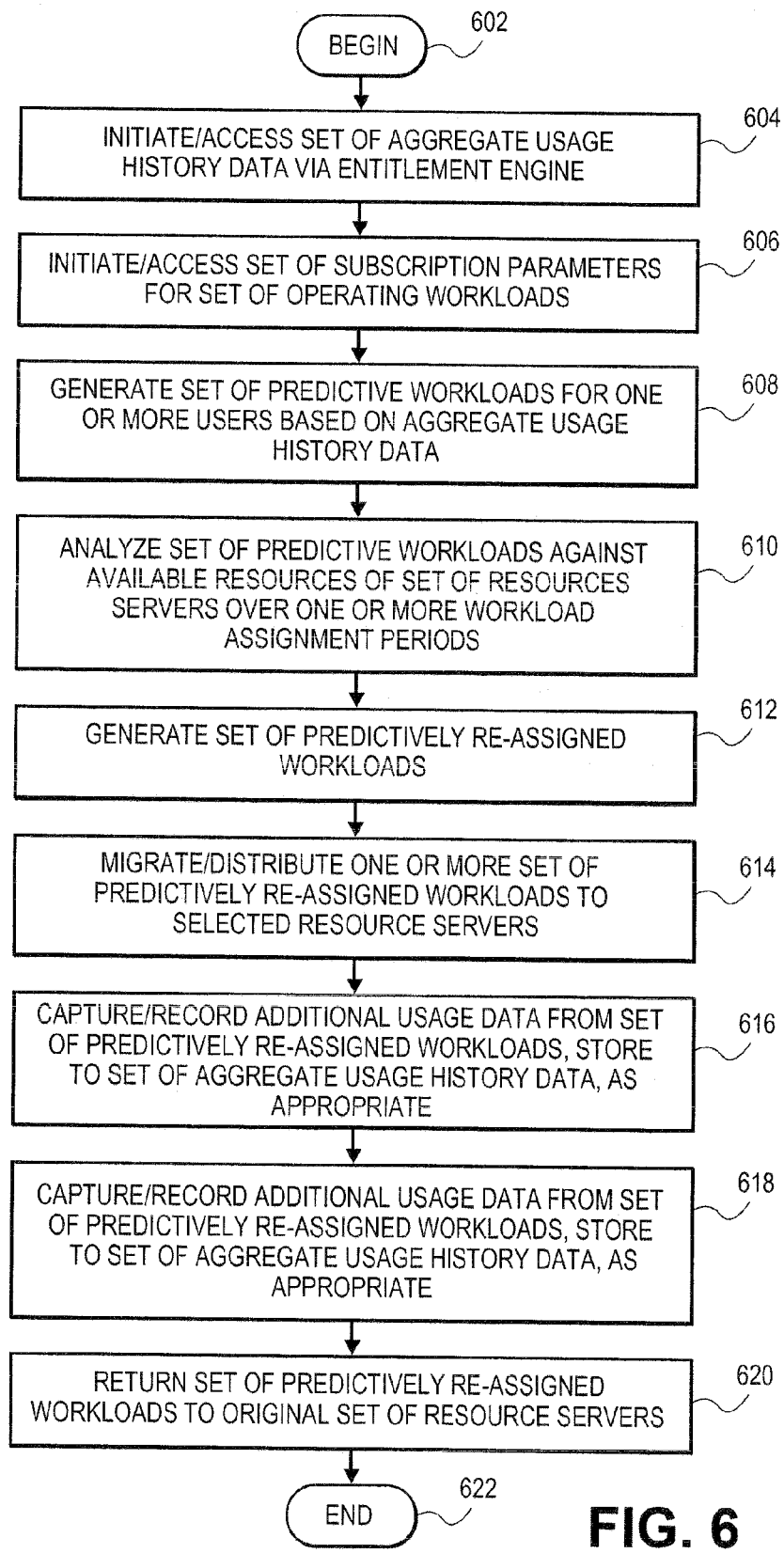
FIG. 6 illustrates a flowchart for generating sets of predictively re-assigned user workloads for distribution to different sets of resource servers over different periods of time, according to various embodiments.

FIG. 6 illustrates a flowchart of overall processing to perform various processing to identify, track, and manage predictively re-assigned workloads and other operations related to the shifting or realignment of the set of resource servers 108 and/or other infrastructure and support for a set of client machines, according to various embodiments of the present teachings. In 602, processing can begin. In 604, an administrator and/or other user can initiate and/or access the set of aggregate usage history data 146 for one or more client machines operating in set of host clouds 142 and/or other environments. In 606, the administrator and/or other user can initiate and/or access a set of subscription parameters 156 associated with the machines operating in the set of host clouds 142, including for instance data reflecting resource consumption limits, service level agreements, subscription costs, subscription or consumption periods, and/or other information related to the consumption of resources in the set of host clouds 142 and/or other environments. In 608, the cloud management system 104, workload management module 140, and/or other logic or service can generate a set of predictive workloads 172 for one or more users based on the aggregate usage history data 146, the set of subscription parameters 156, and/or other data, logic, and/or factors. In 610, the cloud management system 104, workload management module 140, and/or other logic or service can analyze the set of predictive workloads 172 again the available resources of the set of resource servers 108 over one or more workload assignment periods 164. Thus for instance, a collection of one hundred virtual machines for a given user can have a predictive processor load of 95% and memory load of 100% from 3 p.m. to 4 p.m. during weekdays, in contrast to a predictive workload including a processor load of 5% and memory load of 10% for the same hundred virtual machines for a second workload assignment period of 7 p.m. to 8 p.m. during week days. Other intervals, periods, and/or durations can be used in the one or more workload assignment periods 164.

In 612, the cloud management system 104, workload management module 140, and/or other logic or service can generate a set of predictively re-assigned workloads 162 based on, for instance, the set of predictive workloads 172, the aggregate resource usage history 146, the one or more workload assignment periods 164, information relating to the availability, pricing, service levels, and/or other parameters related to the resources provided by the set of resource servers 108, and/or other data or information. In aspects, the set of predictively re-assigned workloads 162 can include, for instance, a specification or indication to move the provisioning of processor and memory resources to a second operator of a group of servers in the set of resource servers from 7 p.m. to 8 p.m. from a first operator who provided or is scheduled to provide the same resources from 3 p.m. to 4 p.m. In aspects, the shift of the selected providers in or from the set of resource servers 108 can be made based on business rules or logic, such as to select a new resource host in those servers if the cost of those resources is at least 10% less than an original source during one or more workload assignment periods 164, while still providing assurance of at least 90% of required service levels with options for re-clouding or rollover of any needed shortfall. Other logic, functions, and/or rules can be used to identify or generate the set of predictively re-assigned workloads 162.

In 614, the cloud management system 104, workload management module 140, and/or other logic or service can migrate and/or distribute one or more, or all, of the set of predictively re-assigned workloads 162 to one or more selected servers in the set of resource servers 108 for the one or more workload assignment periods 164. In aspects, the cloud management system 104, workload management module 140, and/or other logic or service can initiate that migration, shift, and/or re-distribution of the user's set of operating workloads 166 and/or other executing applications, services, and/or processes to a new or different set of subset of the set of resource servers 108 using configuration commands transmitted via one or more networks 106 and/or other network management channels, connections, and/or operations. In 616, the cloud management system 104, workload management module 140, and/or other logic or service can capture the metered or other subscription or support costs, and/or other factors related to operating the set of predictively re-assigned workloads 162 in the selected set or subset of support servers 108 during the one or more workload re-assignment period 164. In 618, the cloud management system 104, workload management module 140, and/or other logic or service can capture and/or record additional usage data from the set of predictively re-assigned workloads 162, and store that data to the set of aggregate usage history 146, as appropriate. In 620, the cloud management system 104, workload management module 140, and/or other logic or service can return the set of predictively re-assigned workloads 162 to the original set of resource servers 108 from which the re-assigned workloads were migrated, for instance after the expiration of one or more workload assignment period 164. In 622, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. Other resources described as singular or integrated can in embodiments be plural or distributed, and resources described as multiple or distributed can in embodiments be combined. The scope of the invention is accordingly intended to be limited only by the following claims.

The invention claimed is:

1. A method, comprising:
identifying a set of operating workloads for a set of client machines in a set of host clouds in a first time period, the set of client machines being instantiated via a first set of resource servers, the set of host clouds being communicably coupled to a centralized cloud management system via a network, determining, by a processing device of the cloud management system, resource consumption limits for the set of client machines in view of a subscription period in which subscription users are able to request resources from the set of host clouds to host the set of operating workloads;

accessing, by the processing device, a resource usage history of the set of client machines in the set of host clouds, the resource usage history comprising a record of consumption of resources consumed from the first set of resource servers;

generating, by the processing device, a set of predictively re-assigned workloads from the set of operating workloads in view of the resource usage history, a set of resource procurement parameters associated with the first set of resource servers and the resource consumption limits during the subscription period; and responsive to a resource shortfall for the set of operating workloads in view of the resource consumption limits, migrating, by the processing device, the set of predictively re-assigned workloads to resource servers of a second set of resource servers, wherein the resource servers are scheduled to execute the set of predictively re-assigned workloads in a second time period, each of the resource servers of the first set of resource servers being different from each of the resource servers of the second set of resource servers, wherein the set of predictively re-assigned workloads comprises a set of reduced estimated workloads to be inserted for execution on the resource servers of the second set of resource servers.

2. The method of claim 1, wherein the record of consumption of resources indicates a greater consumption of resources from the first set of resource servers in the first time period than in the second time period.

3. The method of claim 2, wherein the set of predictively re-assigned workloads comprises a set of reduced estimated workloads to be inserted for execution on the second set of resource servers.

4. The method of claim 3, wherein the second set of resource servers comprises a reduced workload as compared to the first set of resource servers.

5. The method of claim 4, wherein the set of resource procurement parameters for the second set of resource servers in the second time period comprises a lower net cost to a cloud provider for the provisioning of the set of consumed resources than the first set of resource servers.

6. The method of claim 1, further comprising updating the resource usage history to reflect resource consumption from the second set of resource servers in the second time period.

7. The method of claim 1, further comprising receiving user input to select the set of predictively re-assigned workloads.

8. The method of claim 1, wherein the resources consumed from the first set of resource servers comprises at least one of processor resources, memory resources, storage resources, bandwidth resources, communications port resources, operating system resources, application resources, or appliance resources.

9. The method of claim 1, wherein the set of resource procurement parameters comprises at least one of a subscription cost, a minimum number of software images to be deployed in the set of host clouds, a maximum number of software images to be deployed in the set of host clouds, an operating system specification, a software application specification, a minimum processor throughput specification, a maximum processor throughput specification, a minimum memory amount specification, a maximum memory amount specification, a minimum storage capacity specification, a maximum storage capacity specification, a minimum bandwidth specification, a maximum bandwidth specification, a minimum set of communications ports specification, a maximum set of communications ports specification, an appliance specification, a service level agreement specification, clustering services, identity management services, backup services, security services, or billing and administrative services.

10. A system, comprising:
  an interface to a data store, the data store to store a resource usage history of a set of client machines in a set of host clouds, the resource usage history comprising a record of consumption of resources consumed from a set of resource servers; and
  a processor of a centralized cloud management system, to communicate with the data store via the interface, the processor to:
  identify a set of operating workloads for the set of client machines in the set of host clouds in a first time period, the set of client machines being instantiated via a first set of resource servers, the set of host clouds being communicably coupled to the cloud management system via a network,
  determine resource consumption limits for the set of client machines in view of a subscription period in which subscription users are able to request resources from the set of host clouds to host the set of operating workloads,
  access the resource usage history of the set of client machines in the set of host clouds,
  generate a set of predictively re-assigned workloads from the set of operating workloads in view of the resource usage history, a set of resource procurement parameters associated with the with the first set of resource servers and the resource consumption limits during the subscription period, and
  responsive to a resource shortfall for the set of operating workloads in view of the resource consumption limits, migrate the set of predictively re-assigned workloads resource servers of a second set of resource servers, wherein the resource servers are scheduled to execute the set of predictively re-assigned workloads in a second time period, each of the resource servers of the first set of resource servers being different from each of the resource servers of the second set of resource servers,
  wherein the set of predictively re-assigned workloads comprises a set of reduced estimated workloads to be inserted for execution on the resource servers of the second set of resource servers.

11. The method of claim 1, further comprising adjusting the resource consumption limits in view of a subscription cost.

12. The method of claim 1, wherein the set of predictively re-assigned workloads reflects an accumulated usage consumption associated with a subscription user account over the first time period.

13. The method of claim 1, wherein the mitigating comprises determining a minimum cost reduction associated with a subscription user account to satisfying the set of predictively re-assigned workloads in view of the shortfall.

14. The system of claim 10, wherein the set of resource procurement parameters comprises at least one of a subscription cost, a minimum number of software images to be deployed in the set of host clouds, a maximum number of software images to be deployed in the set of host clouds, an operating system specification, a software application specification, a minimum processor throughput specification, a maximum processor throughput specification, a minimum memory amount specification, a maximum memory amount specification, a minimum storage capacity specification, a maximum storage capacity specification, a minimum bandwidth specification, a maximum bandwidth specification, a minimum set of communications ports specification, a maximum set of communications ports specification, an appliance specification, a service level agreement specification, clustering services, identity management services, backup services, security services, or billing and administrative services.

15. The system of claim 10, wherein the record of consumption of resources indicates a greater consumption of resources from the first set of resource servers in the first time period than in the second time period.

16. The system of claim 10, wherein the second set of resource servers comprises a reduced workload as compared to the first set of resource servers.

17. The system of claim 16, wherein the set of resource procurement parameters for the second set of resource servers in the second time period comprises a lower net cost to a cloud provider for the provisioning of the set of consumed resources than the first set of resource servers.

18. The system of claim 10, wherein the processor further to update the resource usage history to reflect resource consumption from the second set of resource servers in the second time period.

19. The system of claim 10, wherein the processor further to receive user input to select the set of predictively re-assigned workloads.

20. The system of claim 10, wherein the resources consumed from the first set of resource servers comprises at least one of processor resources, memory resources, storage resources, bandwidth resources, communications port resources, operating system resources, application resources, or appliance resources.

21. The method of claim 1, wherein the second set of resource servers offer a specified quantity of resources for the second time period.

22. The system of claim 10, wherein the second set of resource servers offer a specified quantity of resources for the second time period.

23. A non-transitory computer-readable medium comprising executable instructions that, when executed by a processing device, cause the processing device to:
  identify a set of operating workloads for a set of client machines in a set of host clouds in a first time period, the set of client machines being instantiated via a first set of resource servers,
  determine, by the processing device, resource consumption limits for the set of client machines in view of a subscription period in which subscription users are able to request resources from the set of host clouds to host the set of operating workloads,
  access the resource usage history of the set of client machines in the set of host clouds,
  generate a set of predictively re-assigned workloads from the set of operating workloads in view of the resource usage history, a set of resource procurement parameters associated with the with the first set of resource servers and the resource consumption limits during the subscription period, and
  responsive to a resource shortfall for the set of operating workloads in view of the resource consumption limits, migrate the set of predictively re-assigned workloads to resource servers of a second set of resource servers, wherein the resource servers are scheduled to execute the set of predictively re-assigned workloads in a second time period, each of the resource servers of the first set of resource servers being different from each of the resource servers of the second set of resource servers, wherein the set of predictively re-assigned workloads comprises a set of reduced estimated workloads to be inserted for execution on the resource servers of the second set of resource servers.

* * * * *